United States Patent
Patil et al.

(10) Patent No.: US 12,394,197 B2
(45) Date of Patent: Aug. 19, 2025

(54) CONTEXTUAL USAGE CONTROL OF CAMERAS

(71) Applicant: Intel Corporation, Santa Clara, CA (US)

(72) Inventors: Deepti Patil, Bangalore (IN); Anil Kumar, Bangalore (IN); Tamoghna Ghosh, Bangalore (IN); Barnan Das, Newark, CA (US); Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 17/483,401

(22) Filed: Sep. 23, 2021

(65) Prior Publication Data

US 2022/0012491 A1    Jan. 13, 2022

(51) Int. Cl.
*G06V 20/00*    (2022.01)
*G06F 3/16*    (2006.01)
(Continued)

(52) U.S. Cl.
CPC .............. *G06V 20/00* (2022.01); *G06F 3/167* (2013.01); *G06T 7/11* (2017.01); *G06T 7/20* (2013.01);
(Continued)

(58) Field of Classification Search
CPC ...... G06V 20/00; G06V 10/25; G06V 40/161; G06V 40/20; G06V 20/52; G06F 3/167; G06T 7/11; G06T 7/20; G06T 11/001; G06T 11/60; G06T 2207/20132; G06T 11/00; H04N 23/69; H04N 23/695;
(Continued)

(56) References Cited

U.S. PATENT DOCUMENTS

| 2015/0363644 A1 | 12/2015 | Wnuk et al. |
| 2016/0049052 A1* | 2/2016 | Cheatham, III ...... H04W 4/029 348/14.16 |

(Continued)

FOREIGN PATENT DOCUMENTS

| JP | 2021111960 | 8/2021 |
| KR | 20170008064 | 1/2017 |

OTHER PUBLICATIONS

International Search Auhtority, "Search report and Written Opinion," issued in connection with PCT patent application No. PCT/US2022/039309, mailed on Nov. 15, 2022, 11 pages.

(Continued)

*Primary Examiner* — Nasim N Nirjhar
(74) *Attorney, Agent, or Firm* — HANLEY, FLIGHT & ZIMMERMAN, LLC

(57) ABSTRACT

Apparatus, systems, methods, and articles of manufacture are disclosed for contextual usage control of cameras. An example apparatus includes processor circuitry to execute the instructions to: access one or more images from a camera; detect an object in the one or more images; detect a human activity in the one or more images; build a context based on the object and the human activity; create a visual marker on the one or more images; determine a user voice command; determine a control based on the context, the visual marker, and the voice command; and cause a change in one or more of the one or more images based on the control.

22 Claims, 13 Drawing Sheets

(51) Int. Cl.
*G06T 7/11* (2017.01)
*G06T 7/20* (2017.01)
*G06T 11/00* (2006.01)
*G06T 11/60* (2006.01)
*G06V 10/25* (2022.01)
*G06V 40/16* (2022.01)
*G06V 40/20* (2022.01)
*H04N 23/69* (2023.01)
*H04N 23/695* (2023.01)

(52) U.S. Cl.
CPC ............ *G06T 11/001* (2013.01); *G06T 11/60* (2013.01); *G06V 10/25* (2022.01); *G06V 40/161* (2022.01); *G06V 40/20* (2022.01); *H04N 23/69* (2023.01); *H04N 23/695* (2023.01); *G06T 2207/20132* (2013.01)

(58) Field of Classification Search
CPC .. H04N 23/611; H04N 23/633; H04N 23/635; H04N 23/64
See application file for complete search history.

(56) References Cited

U.S. PATENT DOCUMENTS

| | | | |
|---|---|---|---|
| 2019/0166305 A1* | 5/2019 | Carceroni | G06V 40/63 |
| 2019/0222769 A1 | 7/2019 | Srivastava | |
| 2019/0392831 A1 | 12/2019 | Pohl | |
| 2020/0134352 A1 | 4/2020 | Choi et al. | |
| 2020/0177802 A1 | 6/2020 | Jung et al. | |
| 2020/0250453 A1 | 8/2020 | Gupta | |
| 2022/0012491 A1 | 1/2022 | Patil et al. | |
| 2024/0056686 A1* | 2/2024 | Tsunashima | H04N 23/61 |
| 2024/0259525 A1* | 8/2024 | Zhang | H04N 7/147 |

OTHER PUBLICATIONS

European Patent Office, "Extended European Search Report," issued in connection with European Patent Application No. 22873373.9, dated Jul. 10, 2025, 10 pages.

* cited by examiner

CONTEXTUAL USAGE CONTROL OF CAMERAS

FIELD OF THE DISCLOSURE

This disclosure relates generally to cameras and, more particularly, to contextual usage control of cameras.

BACKGROUND

Cameras include different usage controls such as changing a focus setting, starting a recording, capturing an image, setting a flash, zooming, etc. Typically, control of a camera is set by manual interaction with the camera.

BRIEF DESCRIPTION OF THE DRAWINGS

In general, the same reference numbers will be used throughout the drawing(s) and accompanying written description to refer to the same or like parts.

DETAILED DESCRIPTION

Camera control is typically manual by interaction with the device via touch including, for example, turning a knob and/or pressing a button. Additionally, in some examples, interaction also occurs via touch screens that allow for interacting with different objects in a scene presented on or through a camera. For example, the user may touch an object on the screen indicating to one or more processors to take an action such as, for example, drive an analog or digital focus subsystem to change focus to the object selected by the user. In these examples, interacting with camera controls while recording a video or taking a photograph is cumbersome as it involves use of both hands: one to hold the device and another to tap the screen to select the object.

Examples disclosed herein implement contextual usage control for cameras. With contextual usage control, usage context and associated intended control features are extracted from multiple modalities. Example modalities include voice detection (e.g., via natural language processing and/or automatic speech recognition), body posture, gestures, gaze direction, movement of one or more users, user interaction with the camera and/or camera scene, and/or other modalities disclosed herein. The processing circuitry such as, for example, processing circuitry included in a camera, evaluates the different modalities to determine the context of the objects in the scene, the behavior of the human subjects, and their intended control of the camera. For example, a subject in the image may gesture, such as for example, point, to indicate that the camera should zoom or pan to an object.

Also, depending on the usage context, the processing circuitry also intelligently detects objects and marks the objects with contextual readable visual identifiers so that control may be applied naturally via voice commands. For example, examples disclosed herein detect objects and/or parts of the scene and mark the objects and/or scene elements with contextual readable visual identifiers or markers so that the user may be able to control them with voice. For example, a scene may be marked with a label that reads "background" or includes the names of people in the scene. A user may speak commands such as "zoom on background" or "crop to person X's face." Examples disclosed herein can automatically process such commands and change an image without a user manually operating camera controls. In some examples, voice commands can be processed to effect a change in the image when visual markers are not used.

As used herein, an "object" includes physical items including humans. Also as used herein, human "activity" includes movement, gestures, orientation of body parts, facial expressions, gaze, spoken speech, and sign language. Also, the terms "user(s)" and "subject(s)" may be used interchangeably throughout to indicate a person controlling the camera and/or a person pictured in the image.

Figure 1:
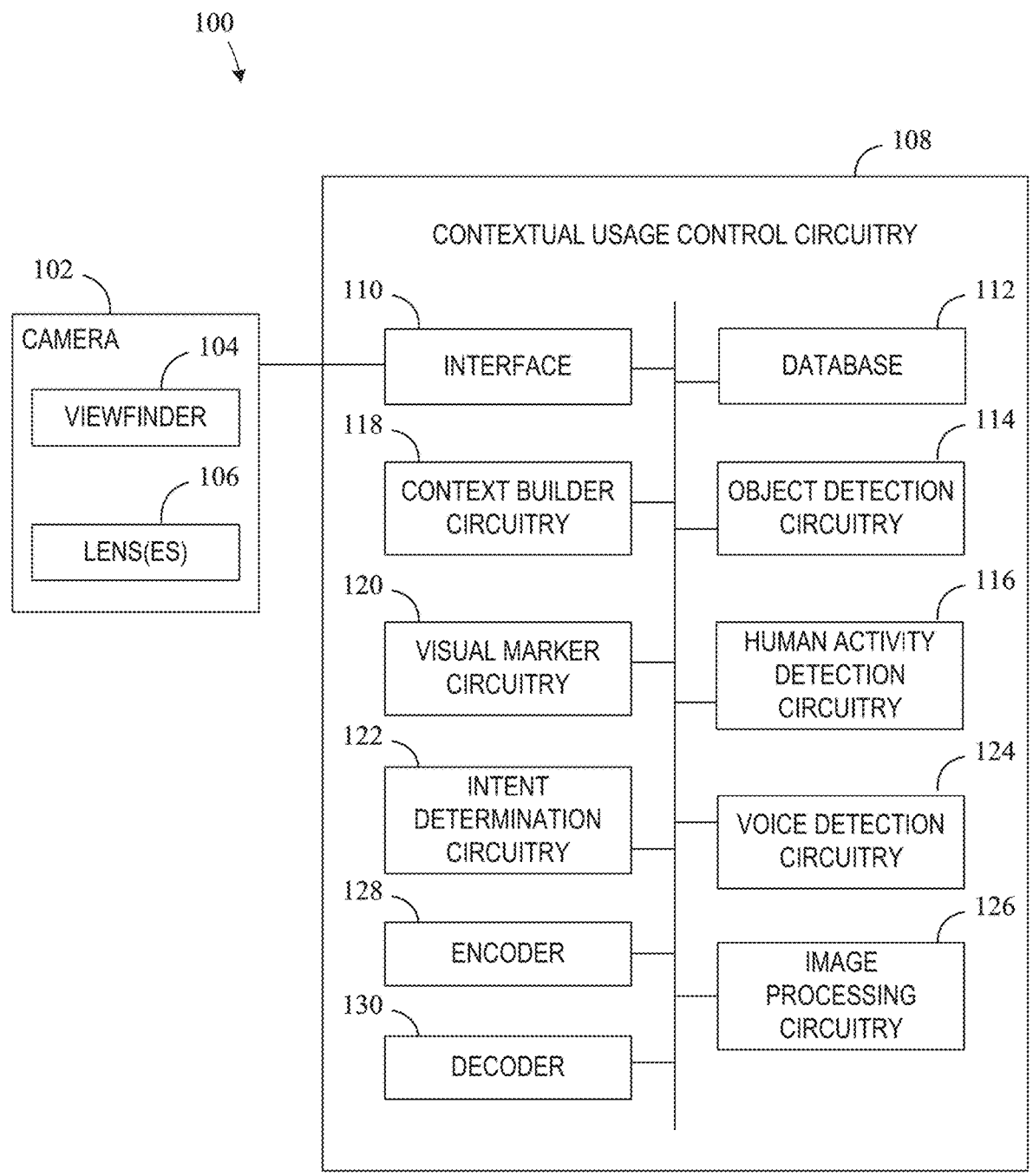
FIG. 1 is a block diagram of an example system for contextual usage control of cameras in accordance with teachings of this disclosure.

FIG. 1 illustrates an example system 100 for contextual usage control of cameras. The example system 100 includes an example camera 102, which includes an example viewer finder 104, one or more example lens(es) 106, and other camera components (not shown). The example system 100 also includes example contextual usage control circuitry 108. In some examples, one or more elements of the contextual usage control circuitry 108 is included within the camera 102. In the illustrated example, the contextual usage control circuitry 108 includes an example interface 110, an example database 112, example object detection circuitry 114, example human activity circuitry 116, example context builder circuitry 118, example visual marker circuitry 120, example intent determination circuitry 122, example voice detection circuitry 124, example image processing circuitry 126, an example encoder 128, and an example decoder 130.

The example camera 102 may be used to capture an image using the lens(es) 106. In some examples, the camera 102 captures multiple images. In some examples, one image or multiple images are photographs. In some examples multiple images are a video. In some examples, the video is a pre-recorded video. In some examples, the multiple images are a live transmission or a livestream. The term "image" or "images" may be used throughout to refer interchangeably to any of the foregoing photographs, videos, and/or any other type of still image or moving images. The term "scene"

also may be used herein to refer to images such as, for example, the scene in the viewfinder 104.

The example interface 110 receives, obtains, and/or accesses the scene in the viewfinder 104 to input images and any related data into the contextual usage control circuitry 108. The contextual usage control circuitry 108 analyzes the images to determine device usage context across multiple modalities including, for example, user voice commands, user narration, gaze detection and/or direction, head orientation, facial expressions, sign language, gestures, posture, poses, movement, location of objects and/or human, relative positioning of objects and/or humans, camera touch controls, background lighting, background sounds, environment, etc.

The example object detection circuitry 114 identifies objects in an image. In some examples, the object detection circuitry 114 implements a real-time object detection algorithm that identifies specific objects in images. In some examples, the object detection circuitry 114 uses artificial intelligence and machine learning including, for example, a deep convolutional neural network (CNN) to detect objects. In some examples, the object detection circuitry 114 sorts objects in images into categories based on object characteristics. In some examples, the object detection circuitry 114 processes images as structured arrays of data and identify patterns between them. In some examples, the object detection circuitry 114 uses the CNN algorithm to score objects and/or regions of an image based on similarities. In some examples, the similarities are determined based on pre-defined categories of object characteristics. In some examples, the object detection circuitry 114 implements a bounding box regression algorithm to score the objects. The object detection circuitry 114 separates an image into a grid. Respective ones of the grid cells predict some number of boundary boxes around objects that score highly with the predefined categories. In some examples, the object detection circuitry 114 detects only one object per bounding box. The object detection circuitry 114 determines that objects and/or regions with high scores are a positive indication that the object and/or region are to be associated with the category related to the score.

In addition to object detection, the object detection circuitry 114 can detect elements of a scene including, for example, parts, features, characteristics and/or areas of a scene. For example, the object detection circuitry 114 may determine quadrants of an image, a foreground, a background, etc. In some examples, the object detection circuitry 114 detects object coordinates and vectors. In some examples, the object detection circuitry 114 tracks objects based on the coordinates and vectors. For example, the object detection circuitry 114 may track stationary objects, movement velocity, trajectories, etc. Also, in some examples, the object detection circuitry 114 can detect if a camera has been moved, which may lead to a re-determination of objects in an image.

The example human activity detection circuitry 116 detects features, actions, and sounds from human such as, for example, those disclosed herein. In some examples, there is overlap between the object detection circuitry 114 and the human activity detection circuitry 116 when, for example, a human is the object. In some examples, the human activity detection circuitry 116 implements artificial intelligence and machine learning to detect human activity. For example, the human activity detection circuitry 116 may implement automatic speech recognition and/or natural language processing to determine human activity. In some examples, the human activity detection circuitry 116 implements algorithms similar to those disclosed above with respect to the object detection circuitry. In some examples, the human activity detection circuitry 116 implements facial recognition algorithms to determine head and/or face orientation, gaze, and/or to identify a human. In some examples, the human activity detection circuitry 116 detects gestures, poses, etc. In some examples, the human activity detection circuitry 116 detects human activation of one or more touch controls.

The example context builder circuitry 118 builds a context based on the object and the human activity. The context is the device (e.g., camera) usage context including, for example, the environment and/or conditions in which the device is being used and/or intended to be used and/or the content captured and/or intended to be captured by the device. In some examples, the context includes the objects, the regions of the scene, the humans, and/or the human activity. The context builder circuitry 118 builds the context on the device, on another device, at the edge, and/or on the cloud.

The example visual marker circuitry 120 determines visual markers associated with the context. Example visual markers include a string of characters that can be read by the user. For example, the visual marker circuitry 120 determines visual markers that are to be overlayed on the scene and readable by the user in the viewfinder 104. The visual markers enable the user to give verbal commands specific to the content of the image. In some examples, the visual markers are helpful for providing commands related to objects that the user or other subject in an image cannot interact with. In some examples, the visual markers are predefined and stored in the database 112. In other examples, the visual markers are dynamically created, which may then also be stored in the database 112.

There may be several sources used to build the visual markers. In some examples, the visual markers are based on objects or elements of a scene. Elements of a scene include, for example, parts, features, characteristics, and/or areas of a scene. For example, the visual markers may include any or all of back, middle, foreground, background, image quadrants, etc. In some examples, the visual markers are based on specific objects and/or trajectories in the image. In some examples, the visual markers are based on prior usage. In some examples, the visual markers are created based on supplementary information such as, for example, user profile information and/or data from one or more social media platforms. For example, a name of a friend or other contact may be accessed via a social media platform and used to create a visual marker. In some examples, the supplementary information includes crowdsourced data. For example, a plurality of users in a social media setting may provide input and/or commentary and/or otherwise contribute data upon which visual markers may be based. In some examples, when specific identifiers are not available or otherwise may not be used, generic markers may be applied. For example, if the names of the people in an image are not available, labels such as, for example, "Person1", "Perons2", etc. may be applied so that commands using those labels may be used to control the camera. This also may apply to objects such as, for example, "Object1," "Object2," etc.

Figure 2A:
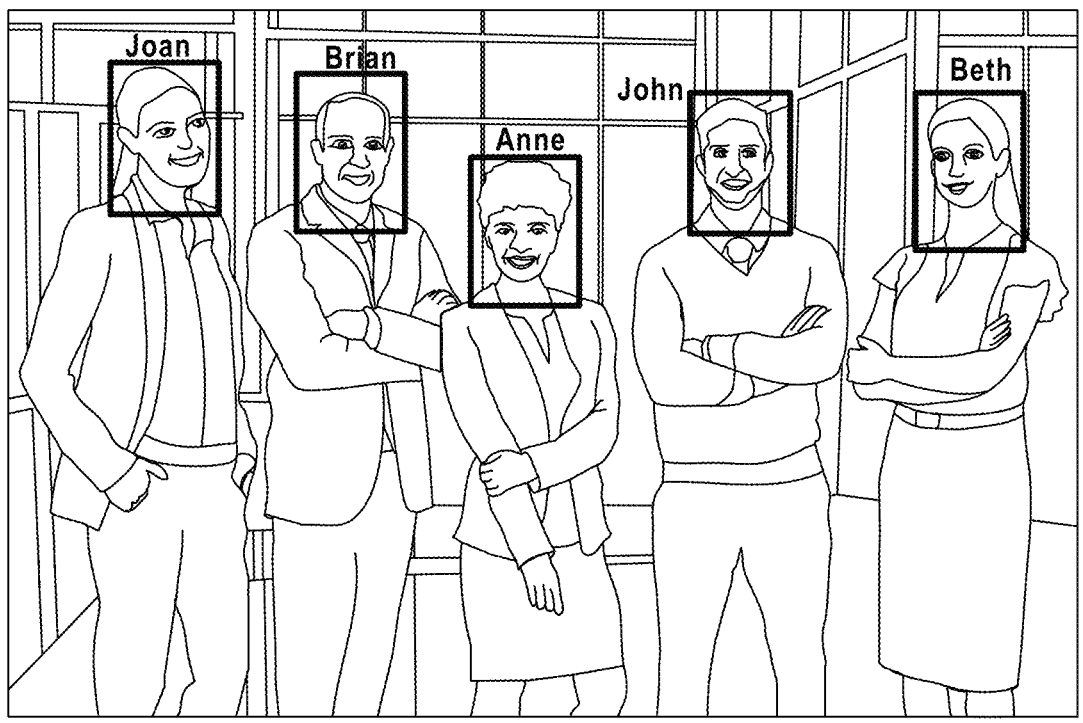
FIG. 2A is an example image with example visual markers.

In some examples, the visual marker circuitry 120 maintains readability of the visual markers. For example, the visual marker circuitry 120 analyzes images, frames, and/or pixels of the region around the object. The visual marker circuitry 120 determines an occlusion factor based on the pixels, location, content, and/or contrast of the frame and the content of the visual marker. For example, dark areas of the image will have a high occlusion factor for visual markers with dark (e.g., black) lettering, font, and/or typeface, but a low occlusion factor for visual markers with light (e.g., white) lettering, font, and/or typeface. In another example, areas of the image with relatively large amount of background detail may have a high occlusion factor. In contrast, areas of the image with relatively plain background detail may have a low occlusion factor. Different areas of the image may have different occlusion factors. The visual marker circuitry 120 selects a position or location, a color, and/or a size of the visual marker based on the occlusion factor so there is minimal occlusion of other parts of the scene or other objects and/or for best contrast of the visual marker with the background and neighboring objects. With the visual marker size, style, and/or location selected, the visual marker circuitry 120 overlays the visual marker on the image for viewing by the user via the viewfinder 104. For example, FIG. 2A shows visual markers including boxes around faces of people in an image and name labels. The visual marker for "Beth" is shown in a color different to be more prominent. The visual marker for "John" is offset to avoid occlusion with the background.

The example voice detection circuitry 124 detects human voices. In some examples, there is overlap with the human activity detection circuitry 116. For example, the voice detection circuitry 124 may alternatively or additionally be used to detect human activity for the building of the context of the image. In such examples, the human activity detection circuitry 116 and/or the voice detection circuitry 124 implements speech recognition and/or language processing when, for example, the human activity is speaking, crying, laughing, singing, and/or other activities that use a human voice. These activities may be identified by a user when giving a command to the camera such as, for example, "focus on the crying baby" or "focus on the people singing."

In some examples, the voice detection circuitry 124 is used to detect image processing commands from the user and/or a subject of the image. For example, a user may speak a command to control the camera such as, for example, the focus commands noted above and/or other commands including "pan frame to the left" etc. The voice detection circuitry 124 utilizes artificial intelligence and machine learning to detect and understand spoken commands. For example, the voice detection circuitry 124 utilizes automatic speech recognition and/or natural language processing. In some examples, the voice detection circuitry 124 identifies keywords, key phrases, tone, and/or emotion from an audio signal containing voice data.

Voice detection with respect to the functionality of the human activity detection circuitry 116 is used to build the context of the scene. For example, keywords may be identified that inform as to the identities of people or objects in the image, a setting, a time of day, an activity type, etc. Voice detection with respect to the functionality of the voice detection circuitry 124 is used to understand intended control of the camera 102.

The example intent determination circuitry 122 determines the intended control of the camera and/or image processing based on the content, the voice command, and/or the visual marker. For example, the intent determination circuitry 122 may associate a specific output of the voice determination circuitry 124 with a visual marker and an image processing action. In some examples, the keywords, key phrases, tone, and/or emotion are used to identify intended control. Also, in some examples, the intent determination circuitry 122 associates the voice command with an image processing action without the use of visual markers. In some examples, the intent determination circuitry 122 associates context such as, for example, a gesture to an object with an image processing action, without the use of voice data.

Figure 2B:
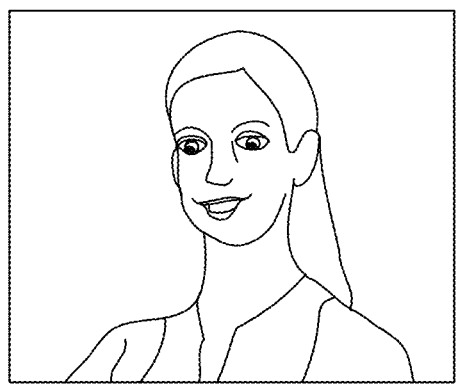
FIG. 2B is a portion of FIG. 2A.

The example image processing circuitry 126 processes the intended control. For example, the image processing circuitry 126 may zoom or pan to a person or object based on the intended control. For example, the user may view the image in FIG. 2A and command "zoom on Beth's face." The voice detection circuitry 124 detects the command, the intent determination circuitry 122 determines the intended control of the camera is to zoom on Beth's face, and the image processing circuitry 126 processes the intended control and produces the image shown in FIG. 2B.

Figure 3B:
FIG. 3B is the image of FIG. 3A with a second focus.
Figure 3A:
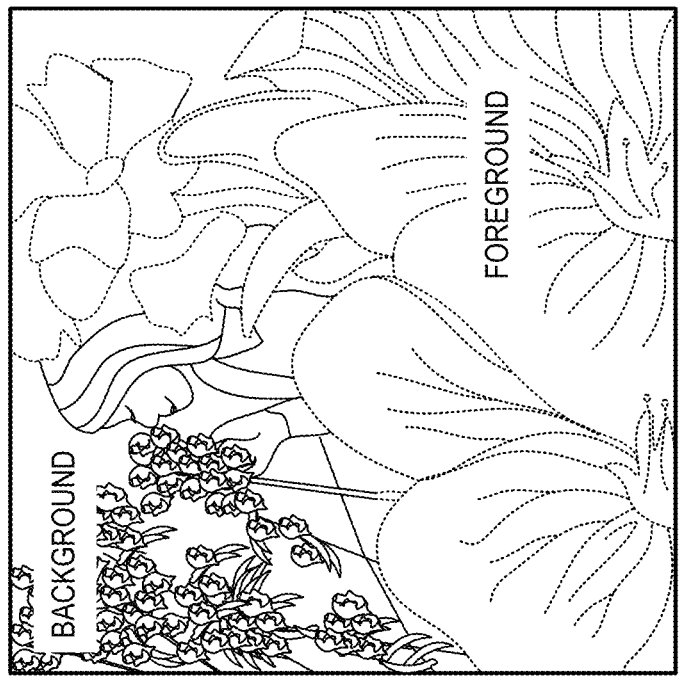
FIG. 3A is an example image with a first focus.

In some examples, the image processing circuitry 126 changes a focus based on an intended control. For example, a user viewing FIG. 3A, which is focused on a foreground, may command "focus on background." The voice detection circuitry 124 detects the command, the intent determination circuitry 122 determines the intended control of the camera is to change the focus to the background, and the image processing circuitry 126 processes the intended control and produces the image shown in FIG. 3B.

In some examples, the intended control relates to the visual markers. For example, the camera 102 can detect a user's speech indicating that a visual marker is not clear or otherwise able to be read. The visual marking circuitry 120 changes the visual markers and the image processing circuitry 126 changes the image accordingly. Also, in some examples, there may be no visual markers, and the intended control is to view visual markers or there may be visual markers but the user wants additional and/or alternative visual markers. In such examples, the user speaks to the camera 102, and the camera 102 detects the user's speech requesting visual markers. The visual marking circuitry 120 creates the visual markers and the image processing circuitry 126 changes the image accordingly.

Figure 4A:
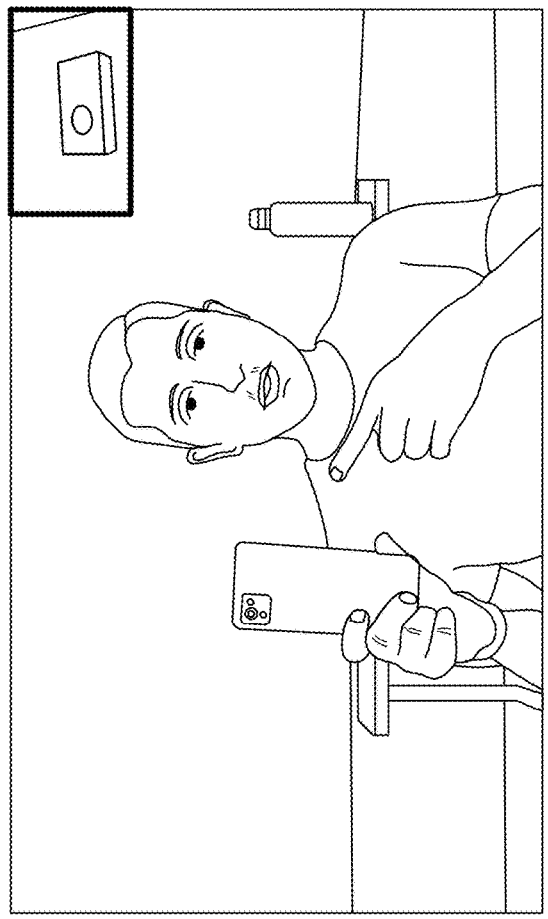
FIG. 4A is an example image with an example gesture.
Figure 4C:
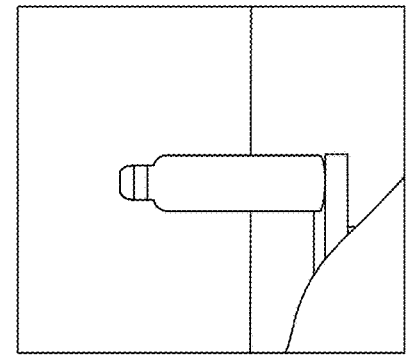
FIG. 4C is a portion of FIG. 4A.
Figure 4B:
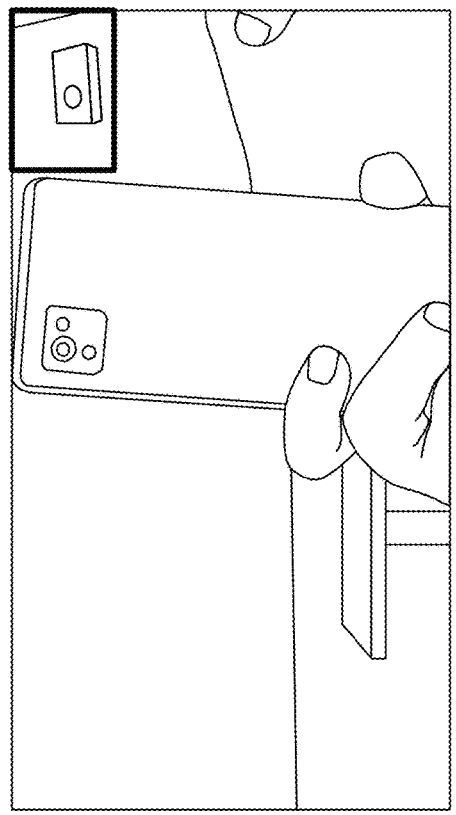
FIG. 4B is a portion of FIG. 4A.

In some examples, the intended control is determined via a gesture. For example, a user may make a gesture in an image such as, for example, pointing as shown in FIG. 4A. The intent determination circuitry 122 determines the intended control of the camera 102 is to zoom to the object being pointed to, and the image processing circuitry 126 processes the intended control and produces the image shown in FIG. 4B. Additionally, or alternatively, the user may provide voice commands related to objects, as disclosed above. For example, the user may say "zoom onto the water bottle." The voice detection circuitry 124 detects the command, the intent determination circuitry 122 determines the intended control of the camera is to zoom to the water bottle, and the image processing circuitry 126 processes the intended control and changes the image of FIG. 4A to that of FIG. 4C.

In some examples, the image processing circuitry 126 tracks an object based on an intended control. In some examples, the image processing circuitry 126 captures an image or records images based on an intended control. Thus, the image processing circuitry 126 causes a change in one or multiple images based on an intended control.

In some examples, the image processing circuitry 126 performs additional image processing including, for example, audio pre-processing prior to implemental of natural language controls such as, for example, automatic speech recognition and/or intent understanding. In some examples, the image processing circuitry 126 implements super-resolution to upscale a low resolution image to high resolution without compromising on image quality.

In some examples, the intent determination circuitry 122 identifies a region of interest based on the intended control. The object detection circuitry 114 may implement an object and/or region tracker, and the image processing circuitry 126 changes the views of the camera to maintain focus on the region of interest. In some examples, multiple frames or every frame is/are upscaled using a super resolution technique during region of interest tracking. The region of interest may be determined by a voice command, a gesture, a detected object, a drawing or tracing on a screen of the viewfinder 104, and/or otherwise via the intended control.

In examples with multiple cameras, the image processing circuitry 126 may cause an image feed or video feed camera source to change to another camera based on the region of interest. In some multiple camera examples, a gaze and/or head orientation of a subject in the image may prompt the image processing circuitry 126 to switch its image/video source to another camera. In some examples, one or more of the context, visual markers, intended control are used alone or in some combination thereamong to cause the image processing circuitry 126 to change cameras.

The contextual usage control circuitry 108 also includes the encoder 128 and the decoder 130. The example encoder 128 encodes the images (e.g., as a video) as processed by the image processing circuitry 126. The contextual usage control circuitry 108 may output the encoded images. The example decoder 130 may be used to process images such as, for example, before object recognition. For example, video decoders provide high quality conversion of analog video in standard (SD) and high definition (HD) resolutions to digital video data in Mobile Industry Processor Interface (MIPI) or Terse RDF Triple Language (TTL) formats. Different camera sources have different decoding schemes.

In some examples, the image processing circuitry 126 causes one or more changes in images other than the one or more images used for object detection and human activity detection. For example, the contextual usage control circuitry 108 may implement machine learning and artificial intelligence and process alternative and/or additional images based on process for other images. For example, images that were processed in a certain manner can serve as the basis for processing other images in a similar manner. Thus, the camera 102 can learn to process multiple images based on a user's commands for one image or set of images. For example, a user command to focus and/or zoom on a person presenting in a livestream can be used to subsequently focus and/or zoom on the person presenting when the person subsequently appears within the view of the camera.

In some examples, the apparatus includes means for accessing one or more images from a camera. For example, the means for accessing may be implemented by the interface 110. In some examples, the interface 110 may be implemented by machine executable instructions such as that implemented by at least blocks 502 of FIG. 5 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the interface 110 is implemented by other hardware logic circuitry, hardware implemented state machines, and/or any other combination of hardware, software, and/or firmware. For example, the interface 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for detecting an object in one or more images. For example, the means for detecting may be implemented by the object detection circuitry 114. In some examples, the object detection circuitry 114 may be implemented by machine executable instructions such as that implemented by at least block 504 of FIG. 5 and all blocks of FIG. 6 executed by processor circuitry, which may be implemented by the example processor circuitry 1012 of FIG. 10, the example processor circuitry 1100 of FIG. 11, and/or the example FPGA circuitry 1200 of FIG. 12. In other examples, the object detection circuitry 114 is implemented by other hardware logic circuitry, hardware implemented state machines, and/or any other combination of hardware, software, and/or firmware. For example, the object detection circuitry 114 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for detecting means for detecting a human activity in one or more images. For example, the means for detecting may be implemented by the human activity detection circuitry 116. In some examples, the human activity detection circuitry 116 may be implemented by machine executable instructions such as that implemented by at least block 506 of FIG. 5 and all blocks of FIG. 7 executed by processor circuitry, which may be implemented by the example processor circuitry 1012 of FIG. 10, the example processor circuitry 1100 of FIG. 11, and/or the example FPGA circuitry 1200 of FIG. 12. In other examples, the human activity detection circuitry 116 is implemented by other hardware logic circuitry, hardware implemented state machines, and/or any other combination of hardware, software, and/or firmware. For example, the human activity detection circuitry 116 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for building a context based on an object and a human activity. For example, the means for building may be implemented by the context builder circuitry 118. In some examples, the context builder circuitry 118 may be implemented by machine executable instructions such as that implemented by at least block 508 of FIG. 5 executed by processor circuitry, which may be implemented by the example processor circuitry 1012 of FIG. 10, the example processor circuitry 1100 of FIG. 11, and/or the example FPGA circuitry 1200 of FIG. 12. In other examples, the context builder circuitry 118 is implemented by other hardware logic circuitry, hardware implemented state machines, and/or any other combination of hardware, software, and/or firmware. For example, the context builder circuitry 118 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for creating a visual marker on one or more images. For example, the means for creating may be implemented by the visual marker circuitry 120. In some examples, the visual marker circuitry 120 may be implemented by machine executable instructions such as that implemented by at least block 512 of FIG. 5 and all blocks of FIG. 8 executed by processor circuitry, which may be implemented by the example processor circuitry 1012 of FIG. 10, the example processor circuitry 1100 of FIG. 11, and/or the example FPGA circuitry 1200 of FIG. 12. In other examples, the visual marker circuitry 120 is implemented by other hardware logic circuitry, hardware implemented state machines, and/or any other combination of hardware, software, and/or firmware. For example, the visual marker circuitry 120 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for determining a user voice command. For example, the means for determining may be implemented by the voice detection circuitry 124. In some examples, the voice detection circuitry 124 may be implemented by machine executable instructions such as that implemented by at least block 514 of FIG. 5 executed by processor circuitry, which may be implemented by the example processor circuitry 1012 of FIG. 10, the example processor circuitry 1100 of FIG. 11, and/or the example FPGA circuitry 1200 of FIG. 12. In other examples, the voice detection circuitry 124 is implemented by other hardware logic circuitry, hardware implemented state machines, and/or any other combination of hardware, software, and/or firmware. For example, the voice detection circuitry 124 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for determining an intended control based on context, visual marker, and voice command. For example, the means for determining may be implemented by the intent determination circuitry 122. In some examples, the intent determination circuitry 122 may be implemented by machine executable instructions such as that implemented by at least block 518 of FIG. 5 executed by processor circuitry, which may be implemented by the example processor circuitry 1012 of FIG. 10, the example processor circuitry 1100 of FIG. 11, and/or the example FPGA circuitry 1200 of FIG. 12. In other examples, the intent determination circuitry 122 is implemented by other hardware logic circuitry, hardware implemented state machines, and/or any other combination of hardware, software, and/or firmware. For example, the intent determination circuitry 122 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, the apparatus includes means for causing a change in one or more images based on intended control. For example, the means for causing may be implemented by the image processing circuitry 126. In some examples, the image processing circuitry 126 may be implemented by machine executable instructions such as that implemented by at least block 520 of FIG. 5 executed by processor circuitry, which may be implemented by the example processor circuitry 1012 of FIG. 10, the example processor circuitry 1100 of FIG. 11, and/or the example FPGA circuitry 1200 of FIG. 12. In other examples, the image processing circuitry 126 is implemented by other hardware logic circuitry, hardware implemented state machines, and/or any other combination of hardware, software, and/or firmware. For example, the image processing circuitry 126 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

While an example manner of implementing the camera 102 and the contextual usage control circuitry 108 is illustrated in FIG. 1, one or more of the elements, processes, and/or devices illustrated in FIG. 1 may be combined, divided, re-arranged, omitted, eliminated, and/or implemented in any other way. Further, the example interface 110, the example database 112, the example object detection circuitry 114, the example human activity circuitry 116, the example context builder circuitry 118, the example visual marker circuitry 120, the example intent determination circuitry 122, the example voice detection circuitry 124, the example image processing circuitry 126, the example encoder 128, the example decoder 130, and/or, more generally, the example contextual usage control circuitry 108 of FIG. 1, may be implemented by hardware alone or by hardware in combination with software and/or firmware. Thus, for example, any of the example interface 110, the example database 112, the example object detection circuitry 114, the example human activity circuitry 116, the example context builder circuitry 118, the example visual marker circuitry 120, the example intent determination circuitry 122, the example voice detection circuitry 124, the example image processing circuitry 126, the example encoder 128, the example decoder 130, and/or, more generally, the example contextual usage control circuitry 108 of FIG. 1 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example contextual usage control circuitry 108 of FIG. 1 may include one or more elements, processes, and/or devices in addition to, or instead of, those illustrated in FIG. 1, and/or may include more than one of any or all of the illustrated elements, processes and devices. In addition, in some examples, the contextual usage control circuitry 108 may be incorporated in the camera 102.

Flowcharts representative of example hardware logic circuitry, machine readable instructions, hardware implemented state machines, and/or any combination thereof for implementing the contextual usage control circuitry 108 of FIG. 1 are shown in FIGS. 5-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5-9, many other methods of implementing the example contextual usage control circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Figure 5:
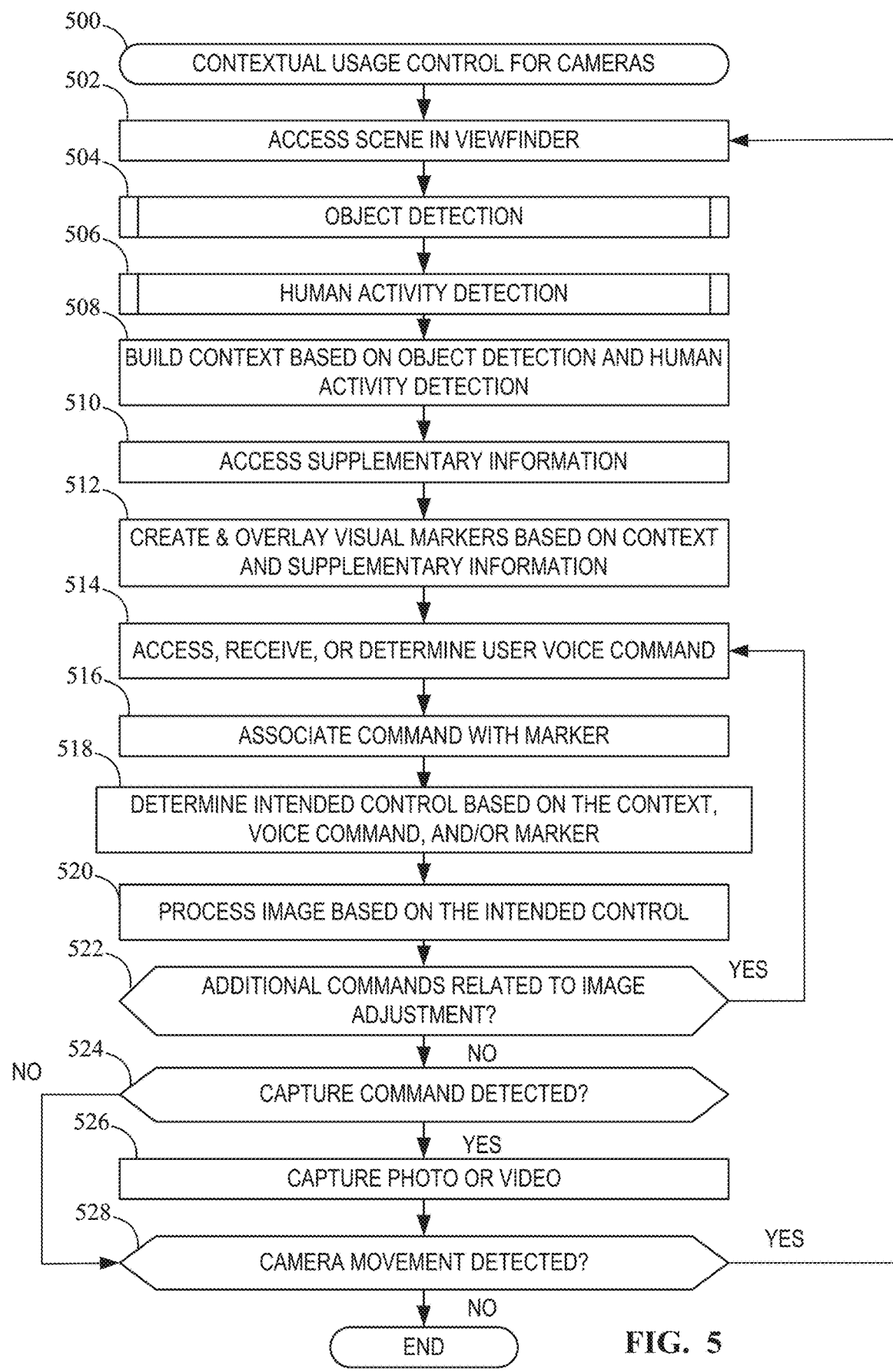
FIGS. 5-9 are flowcharts representative of example machine readable instructions that may be executed by example processor circuitry to implement the system of FIG. 1.

FIG. 5 is a flowchart representative of example machine readable instructions and/or example operations 500 that may be executed and/or instantiated by processor circuitry for contextual usage control for cameras (e.g., the camera 102 of FIG. 1). The machine readable instructions and/or operations 500 of FIG. 5 include the example contextual usage control circuitry 108 (FIG. 1) using the example interface 110 (FIG. 1) to access a scene in the example viewfinder 104 (FIG. 1) of the camera 102 (block 502). The example object detection circuitry 114 (FIG. 1) performs one or more processes of object detection (block 504). An example object detection process is disclosed in connection with FIG. 6. The example human activity detection circuitry 116 (FIG. 1) performs one or more processes of human activity detection (block 206). An example human activity detection process is disclosed in connection with FIG. 7.

The example context builder circuitry 118 (FIG. 1) builds context based on the object detection and the human activity detection (block 508). The example visual marker circuitry 120 (FIG. 1) accesses supplementary information (block 510). For example, the visual marker circuitry 120 accesses information from a user profile, a social media platform, a log of prior use of the camera 102, etc. The visual marker circuitry 120 creates and overlays visual markers based on the context and the supplementary information (block 512). The visual marker circuitry 120 overlays the visual markers on the display of the viewfinder 104 so the visual markers are able to be read by the user. For example, the user may use the visual markers when providing voice commands to operate the camera 102.

The example voice detection circuitry 124 (FIG. 1) accesses, receives, and/or determines a user voice command (block 514). In some examples, the voice detection circuitry 124 uses automatic speech recognition and/or natural language processing to determine a voice command. The voice detection circuitry 124 associates the voice command with one or more of the visual markers (block 516). In some examples, there are preset commands associated with different visual markers depending on the marker type.

In some examples, the example intent determination circuitry 122 (FIG. 1) determines intended control of the camera 102 based on the context, voice command, and/or the visual marker (block 518). In some examples, the intent determination circuitry 122 determines intended control of the camera 102 based on the context and the voice command. For example, there may be no visual markers in some examples and/or the command may not relate to the items marked by the visual markers. In other examples, the intent determination circuitry 122 determines intended control based on context alone such as, for example, when the context of the image includes a gesture indicative of a command.

The example image processing circuitry 126 (FIG. 1) processes the image based on the intended control (block 520). For example, the image processing circuitry 126 adjusts and/or changes one or more images via cropping to a region of interest, zooming, panning, rescaling, changing focus, changing contrast, denoising, sharpening, hue/brightness adjustment, changing camera views, etc. based on the intended control.

The voice detection circuitry 124 determines if there are additional commands related to image adjustment (block 522). If there are additional commands related to image adjustment (block 522: YES), the voice detection circuitry 124 continues with accessing, receiving, and/or determining a user voice command (block 514). In some examples, the intent determination circuitry 122 determines if there are additional commands related to image adjustment (block 522). For example, if there are no voice commands, but intent to adjust an image is derived from the context. In such examples, the intent determination circuitry 122 continues with determining intended control based on context alone (block 518), as disclosed above.

When there are no additional commands related to image adjustment (block 522: NO), the example instructions 500 include the voice detection circuitry 124 determining if a capture command is detected (block 524). The capture command is processed as the intended control. For example, the intent determination circuitry 122 determines that the intended control of the camera 102 is to capture an image. Capturing an image includes capturing a photo and/or recording a video, for example. If a capture command is detected (block 524: YES), the image processing circuitry 126 effects the intended control and captures the photo or video (block 526).

When the voice detection circuitry 124 does not detect a capture command (block 524: NO), the example instructions 500 continue with determining if camera movement is detected (block 528). For example, one or more of the object detection circuitry 114, the human activity detection circuitry 116, and/or the image processing circuitry 126 may detect movement of the camera 102. When movement of the camera 102 is detected (block 228: YES), the example instructions 500 continue with the interface 110 accessing image data corresponding to the scene in the viewfinder 104 (block 502). When movement of the camera 102 is not detected (block 528: NO), the example instructions 500 end.

Figure 6:
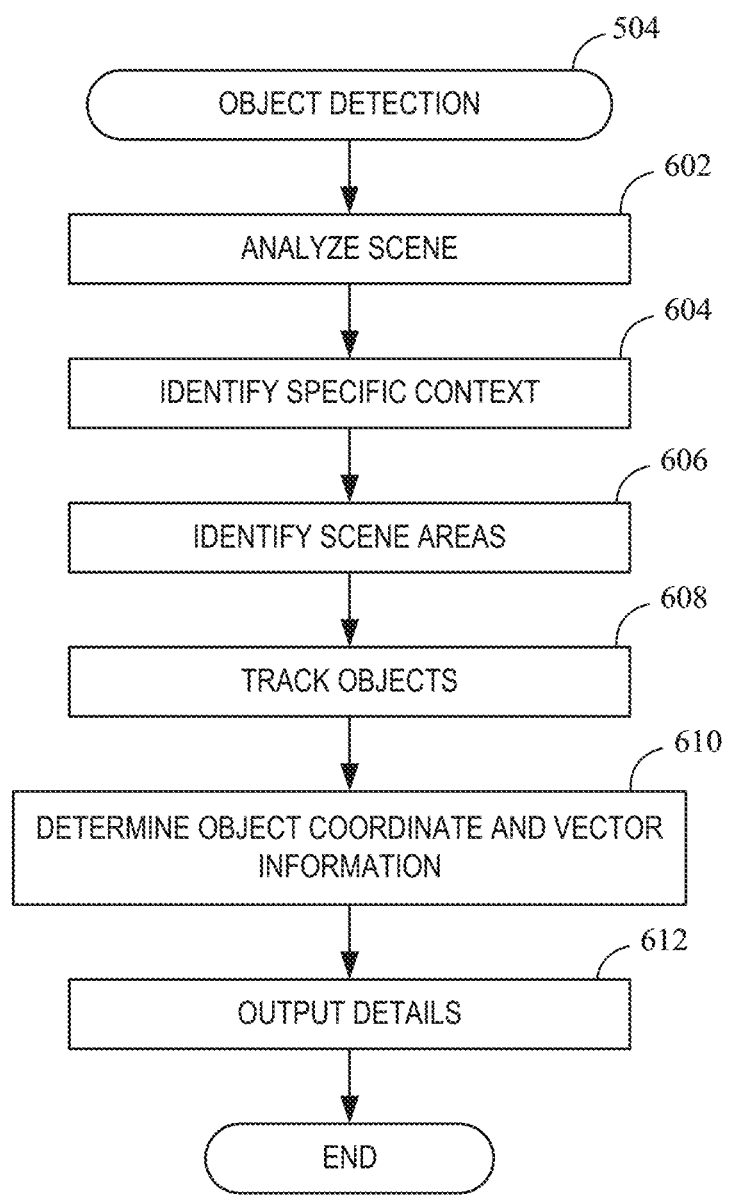

FIG. 6 is a flowchart representative of example machine readable instructions and/or example operations 504 that may be executed and/or instantiated by processor circuitry for object detection. The machine readable instructions and/or operations 504 of FIG. 6 include the example object detection circuitry 114 (FIG. 1) analyzing the scene (block 602). For example, the object detection circuitry 114 implements one or more algorithms including, for example, artificial intelligence and machine learning to analyze a scene and identify elements therein.

Based on the scene analysis, the object detection circuitry 114 identifies specific objects in an image (block 604). The object detection circuitry 114 may identify objects by name, categories, shape, color, position, size, etc. In addition, the object detection circuitry 114 identifies areas of the scene (block 606). For example, the object detection circuitry 114 identifies a foreground, a background, quadrants, two-dimensional coordinates, three-dimensional coordinates, etc.

In some examples, the object detection circuitry 114 tracks one or more objects (block 608). The object detection circuitry 114 determines object coordinate and/or vector information when tracking an object (block 610). The object detection circuitry 114 outputs the details of the object detection (block 612). The information may be used to, for example, identify and/or maintain focus on a region of interest, change a camera view, and/or otherwise to build context as disclosed herein. For example, the details generated by the instructions of FIG. 6 as disclosed herein may be used in connection with the example instructions 500 of FIG. 5.

Figure 7:
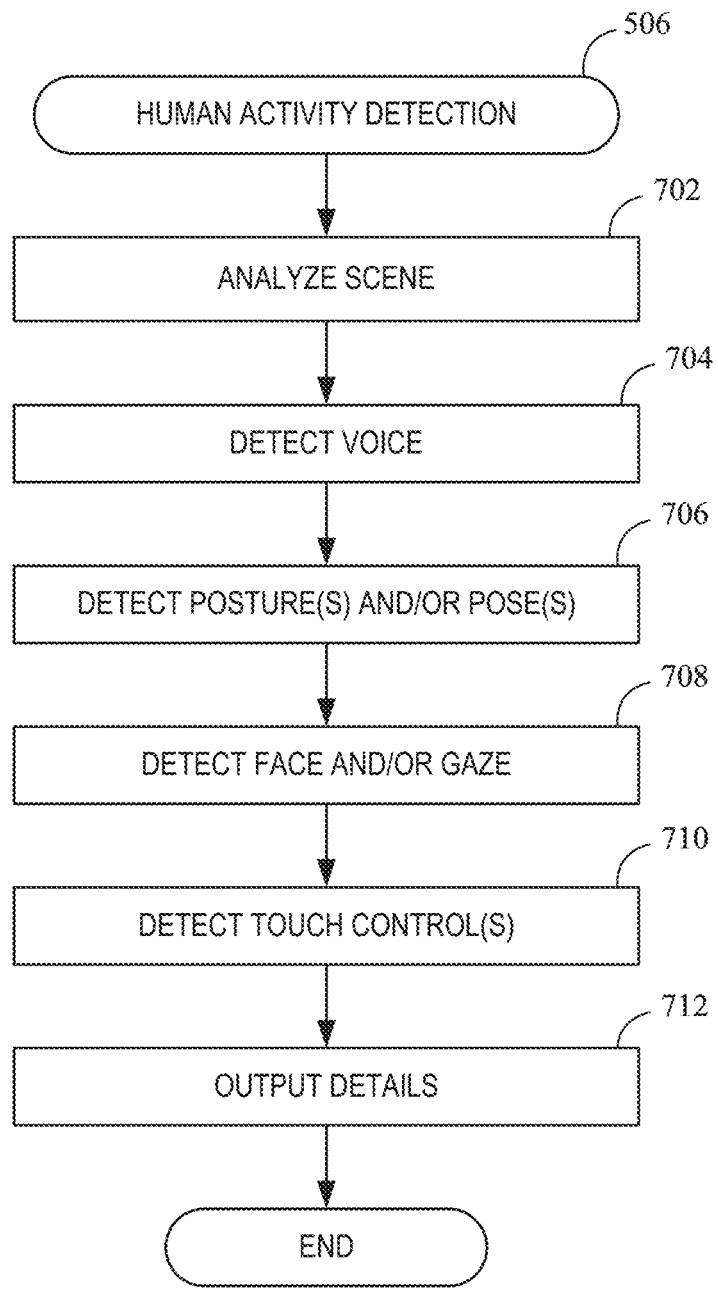

FIG. 7 is a flowchart representative of example machine readable instructions and/or example operations 506 that may be executed and/or instantiated by processor circuitry for human activity detection. The machine readable instructions and/or operations 506 of FIG. 7 include the example human activity detection circuitry 116 (FIG. 1) analyzing the scene (block 702). For example, the human activity detection circuitry 116 implements one or more algorithms including, for example, artificial intelligence and machine learning to analyze a scene and identify elements related to human subjects therein.

The human activity detection circuitry 116 detects voice (block 704). In other examples, the example voice detection circuitry 124 (FIG. 1) detects the voice and/or the voice detection circuitry 124 is incorporated with the human activity detection circuitry 116. As disclosed herein, voice detection may occur via, for example, automatic speech recognition and/or natural language processing.

The human activity detection circuitry 116 also detects postures and/or poses of humans in the images (block 706). For example, the human activity detection circuitry 116 may detect a gesture such as pointing. In addition, the human activity detection circuitry 116 detects faces and/or gazes of the humans in the images (block 708). For example, the human activity detection circuitry 116 may detect a head turned such that the human is looking in a specific direction. The human activity detection circuitry 116 also detects activation of touch controls (block 710).

The human activity detection circuitry 116 outputs the details of the detected activity (block 712). The voice information, gestures, and other human activity may be used to, for example, identify and/or maintain focus on a region of interest, change a camera view, and/or otherwise to build context as disclosed herein. For example, the details generated by the instructions of FIG. 7 as disclosed herein may be used in connection with the example instructions 500 of FIG. 5.

Figure 8:
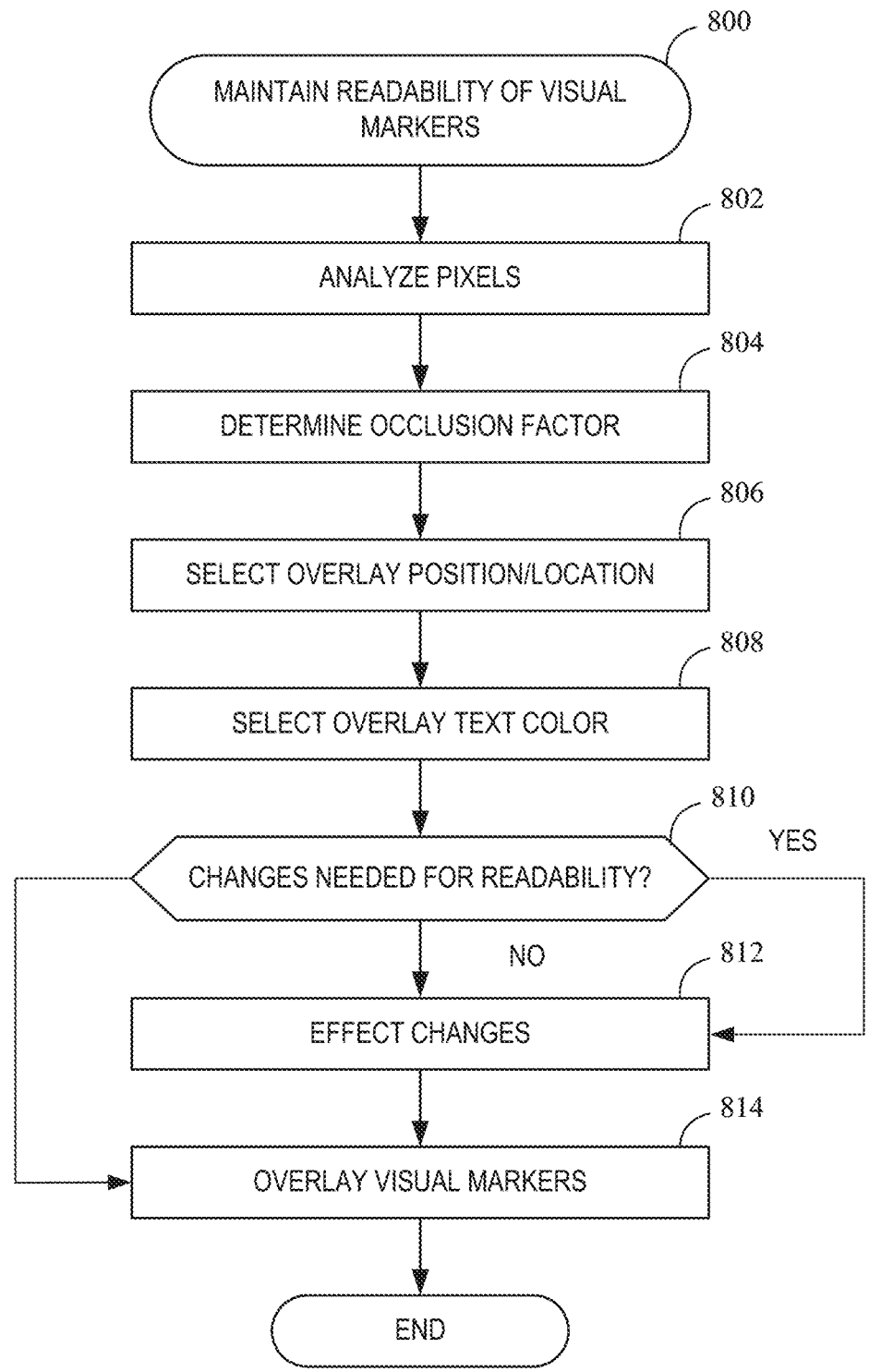

FIG. 8 is a flowchart representative of example machine readable instructions and/or example operations 800 that may be executed and/or instantiated by processor circuitry for maintaining readability of visual markers. The machine readable instructions and/or operations 800 of FIG. 8 include the example visual marker circuitry 120 (FIG. 1) analyzing pixels in an image (block 802). The visual marker circuitry 120 determines occlusion factors for the pixels and/or areas of the image (block 804). In some examples, the visual marker circuitry 120 selects a location and/or position of the visual marker based on the occlusion factors (block 806). In some examples, the visual marker circuitry 120 selects overlay text color based on the occlusion factor (block 808).

In some examples, the visual marker circuitry 120 checks the visual marker and determines if any aspect of the visual marker should be changed for readability (block 810). For example, text size, font, color, position, location, brightness, style, etc. may be altered for a visual marker or a portion of a visual marker to make the marker easier to read. When the visual marker circuitry 120 determines that changes are needed for readability of the visual marker (block 810: YES), the visual marker circuitry 120 effects the changes (block 812). The visual marker circuitry 120 also overlays the visual marker on the display of the viewfinder 102 (block 814). When the visual marker circuitry 120 determines that changes are not needed for readability of the visual marker (block 810: NO), the example instructions 800 continue with the visual marker circuitry 120 overlaying the visual marker on the display of the viewfinder 102 (block 814). The example instructions 800 then end.

Figure 9:
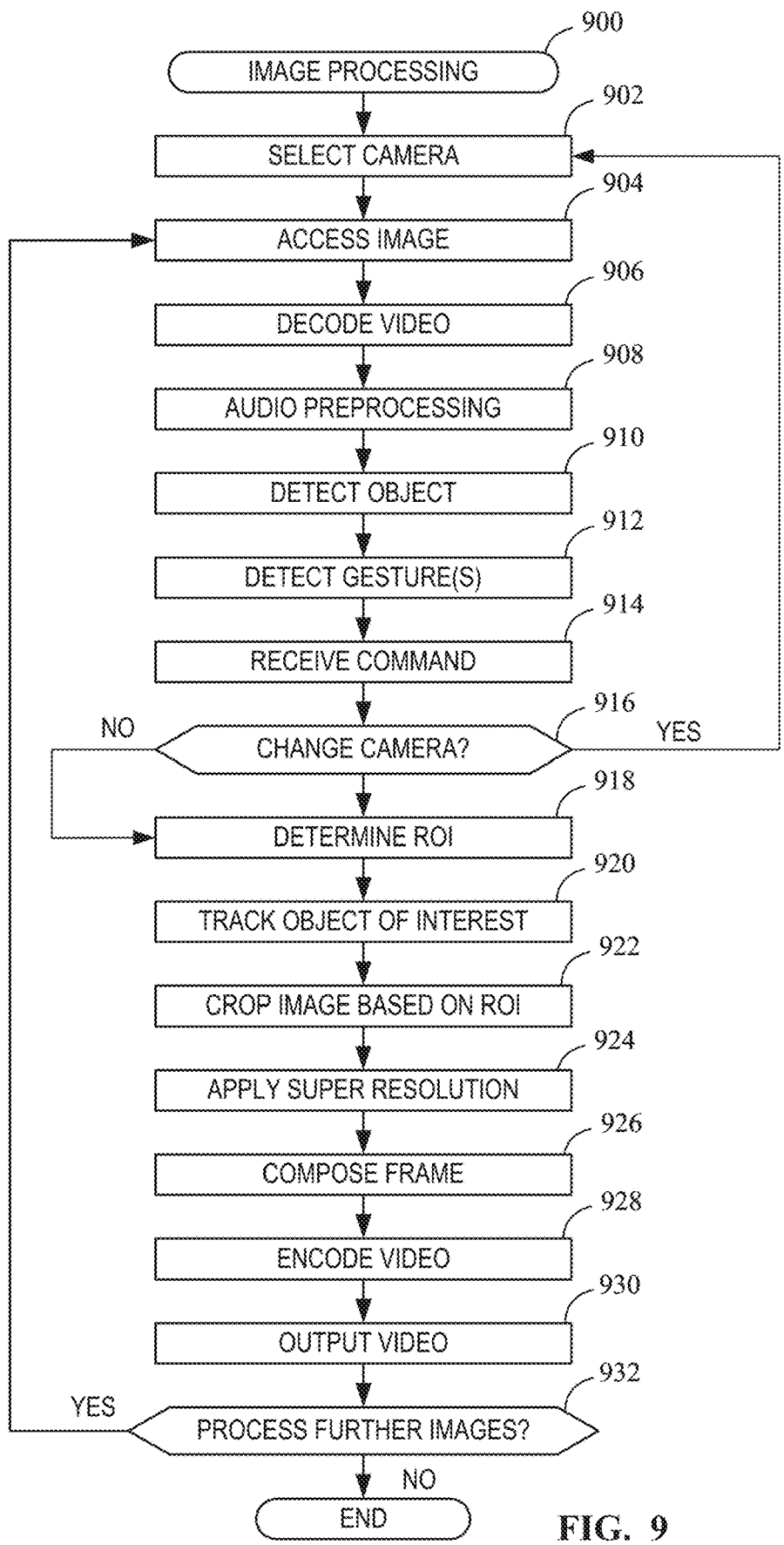

FIG. 9 is a flowchart representative of example machine readable instructions and/or example operations 900 that may be executed and/or instantiated by processor circuitry for image processing including, for example, for region of interest framing. The machine readable instructions and/or operations 900 of FIG. 9 include the example image processing circuitry 126 (FIG. 1) selecting a camera (block 902). Different cameras may be selected based on point of views, regions of interest, object tracking, commands, etc. The example instructions 900 include the example interface 110 (FIG. 1) accessing an image from the selected camera (block 904). In the example of FIG. 9, the image is a pre-recorded video or a livestream. However, the example instructions 900 or portions of the example instructions 900 also may apply to still images. The example decoder 130 (FIG. 1) decodes the video. For example, the decoder 130 may decode the video to change a resolution and/or a format for further processing. The image processing circuitry 126 also performs audio-preprocessing before voice signals are processed (block 908). Some example audio pre-processing techniques include, for example, noise removal, analog-to-digital conversion, equalization, sound classification, etc.

The example instructions 900 also include the example object detection circuitry 114 (FIG. 1) detecting an object in the video (block 910). Object detection may include, for example, the instructions 500, 504 disclosed herein. The object detection circuitry 114 also detects gestures (block 912). The example contextual usage control circuitry 108 (FIG. 1) receives a command (block 914). For example, the command may be received via a gesture detected by the object detection circuitry 114. In some examples, the command may be a voice command detected by the example voice detection circuitry 124 (FIG. 1). In some examples, the command is a combination of one or more detected gestures or movement and one or more voice commands.

In some examples, the system 100 (FIG. 1) includes multiple cameras, and the example instructions 900 include the example image processing circuitry 126 (FIG. 1) determining if the camera should be changed (block 916). For example, the example intent determination circuitry 122 (FIG. 1) determines that the intent of the command, and the image processing circuitry 126 determines that the intent is better achieved by changing the feed or perspective of the video from the perspective of one camera to the perspective of another camera. The determination of whether a camera should be changed may occur any different and multiple points throughout the execution of the example instructions 900. When the image processing circuitry 126 determines that the camera should be changed (block 916: YES), the example instructions 900 continue with the image processing circuitry 126 selecting a camera (block 902).

When the image processing circuitry 126 determines that the camera should not be changed (block 916: NO), the intent determination circuitry 122 identifies or determines a region of interest based on the intended control, which is based on gestures, commands, etc. (block 918). In some examples, the instructions 900 determine if the camera should be switched based on the determination of the region of interest. The object detection circuitry 114 tracks an object of interest (block 920). For example, the object detection circuitry 114 tracks an object within the region of interest and/or an object that defines the region of interest.

The image processing circuitry 126 crops the image based on the region of interest (block 922). For example, the image processing circuitry 126 zooms in the video to focus on the region of interest and continues this operation as the object and region of interest move. The image processing circuitry 126 also applies super resolution to upscale one or more images from low resolution to high resolution (block 924). In some examples, the image processing circuitry 126 applies super resolution to every image or frame of the video during the region of interest tracking.

The image processing circuitry 126 composes the images (block 926). The example encoder 128 (FIG. 1) encodes the video (block 928). The example contextual usage control circuitry 108 (FIG. 1) outputs the video via the interface 110 to, for example, the example viewfinder 104 (FIG. 1). The image processing circuitry 126 determines if further images are to be processed (block 932). When the image processing circuitry 126 determines that further images are to be processed (block 932: YES), the example instructions 900 continue with the interface 110 accessing an image from the selected camera (block 904). When the image processing circuitry 126 determines that no further images are to be processed (block 932: NO), the example instructions 900 end.

One or more of the operations of any of the example instructions 500, 504, 506, 800, 900 FIGS. 5-9 may be incorporated into other ones of the instructions 500, 504, 506, 800, 900. Also, in some examples, any or all of the example instructions 504, 506, 800, 900 of FIGS. 6-9 may be incorporated into the example instructions 500 of FIG. 5.

Figure 10:
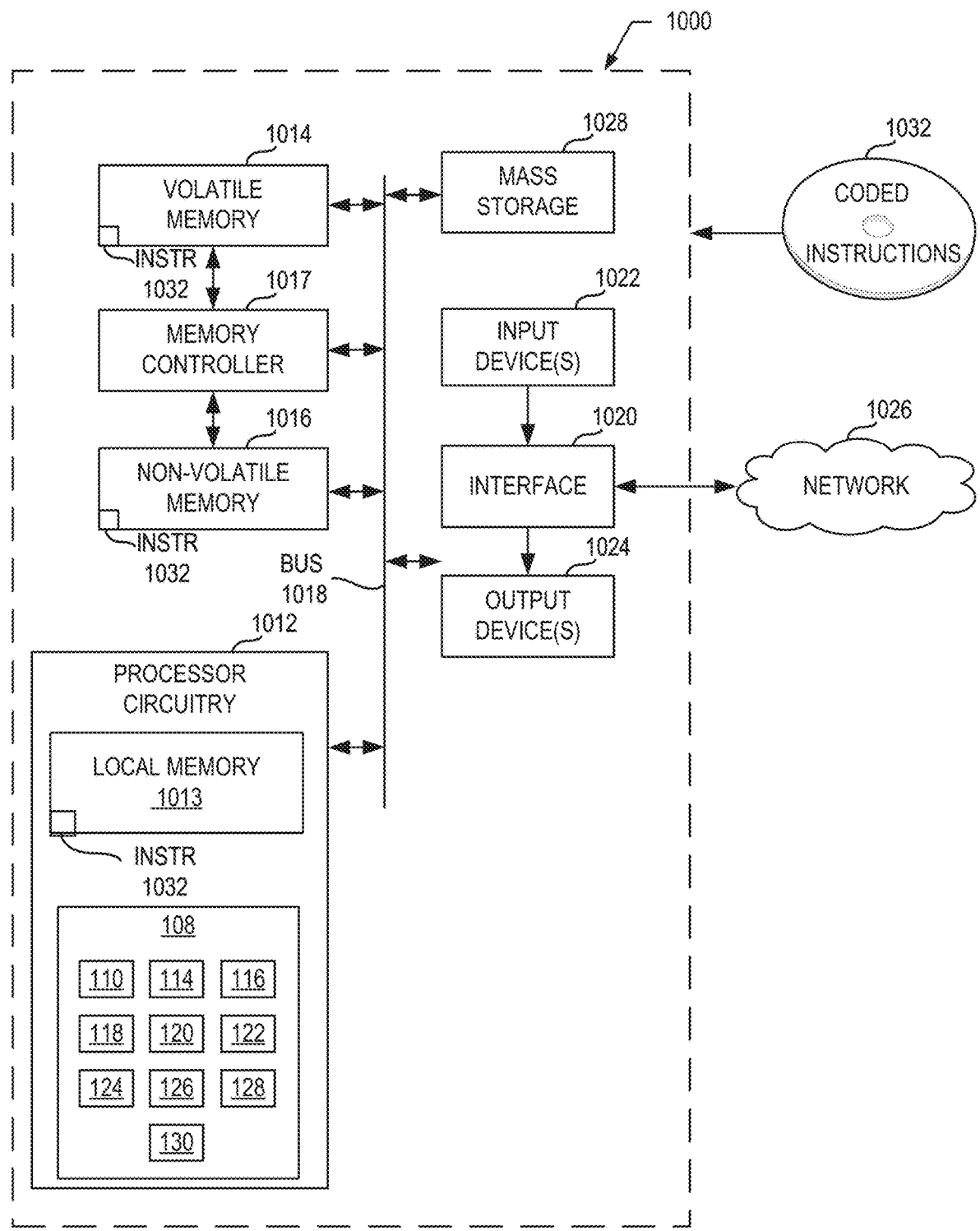
FIG. 10 is a block diagram of an example processing platform including processor circuitry structured to execute the example machine readable instructions of FIGS. 5-9 to implement the system of FIG. 1.

FIG. 10 is a block diagram of an example processor platform 1000 structured to execute and/or instantiate the machine readable instructions and/or operations of FIGS. 5-9 to implement the contextual usage control circuitry 108 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements any of the example interface 110, the example database 112, the example object detection circuitry 114, the example human activity circuitry 116, the example context builder circuitry 118, the example visual marker circuitry 120, the example intent determination circuitry 122, the example voice detection circuitry 124, the example image processing circuitry 126, the example encoder 128, the example decoder 130, and the example contextual usage control circuitry 108 of FIG. 1

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 5-9, may be stored in the mass storage device 1028, in the volatile memory 1014, in the non-volatile memory 1016, and/or on a removable non-transitory computer readable storage medium such as a CD or DVD.

FIG. 5 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 5-9.

The cores 1102 may communicate by an example bus 104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory_20 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Figure 11:
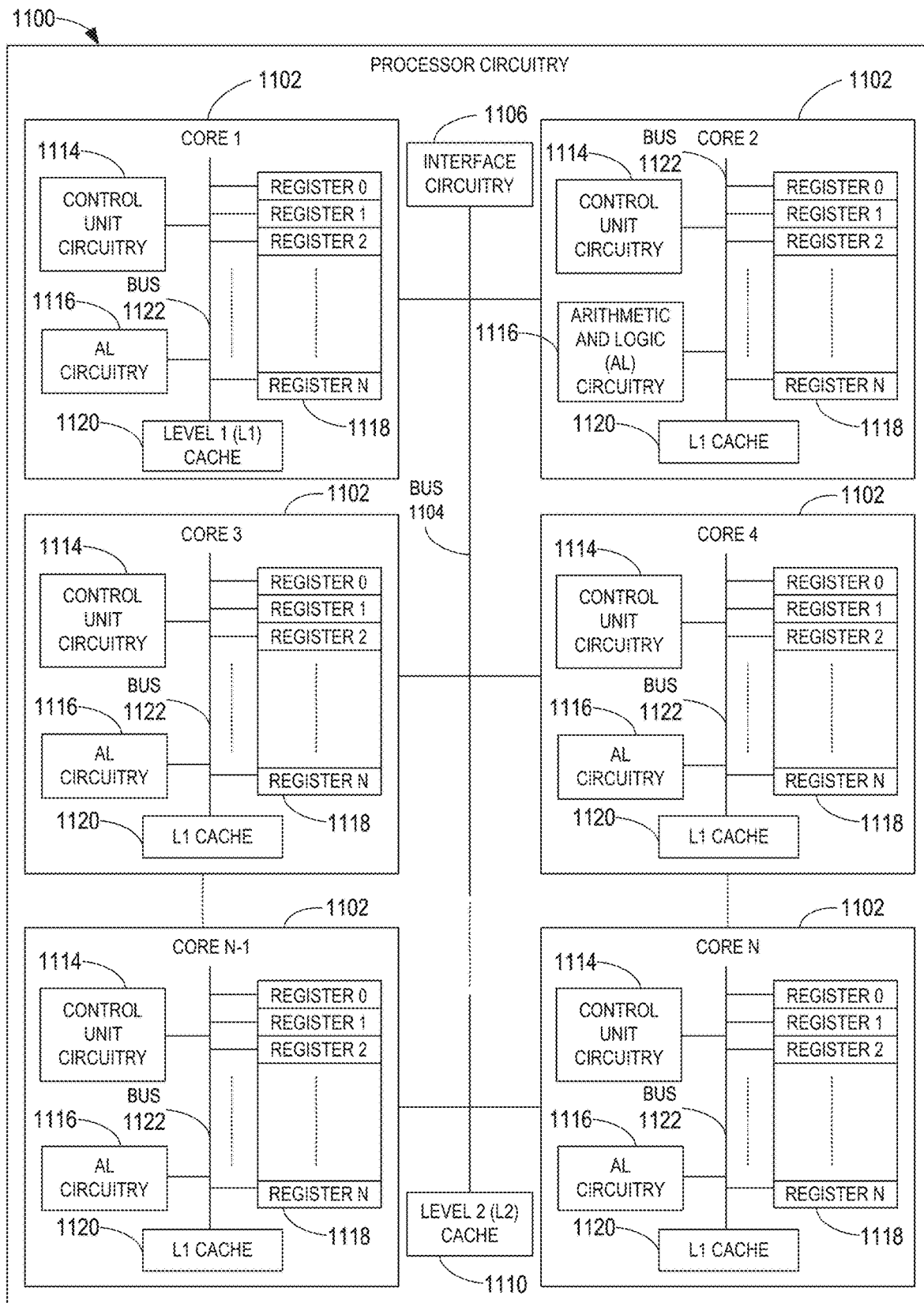
FIG. 11 is a block diagram of an example implementation of the processor circuitry of FIG. 10.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1122 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
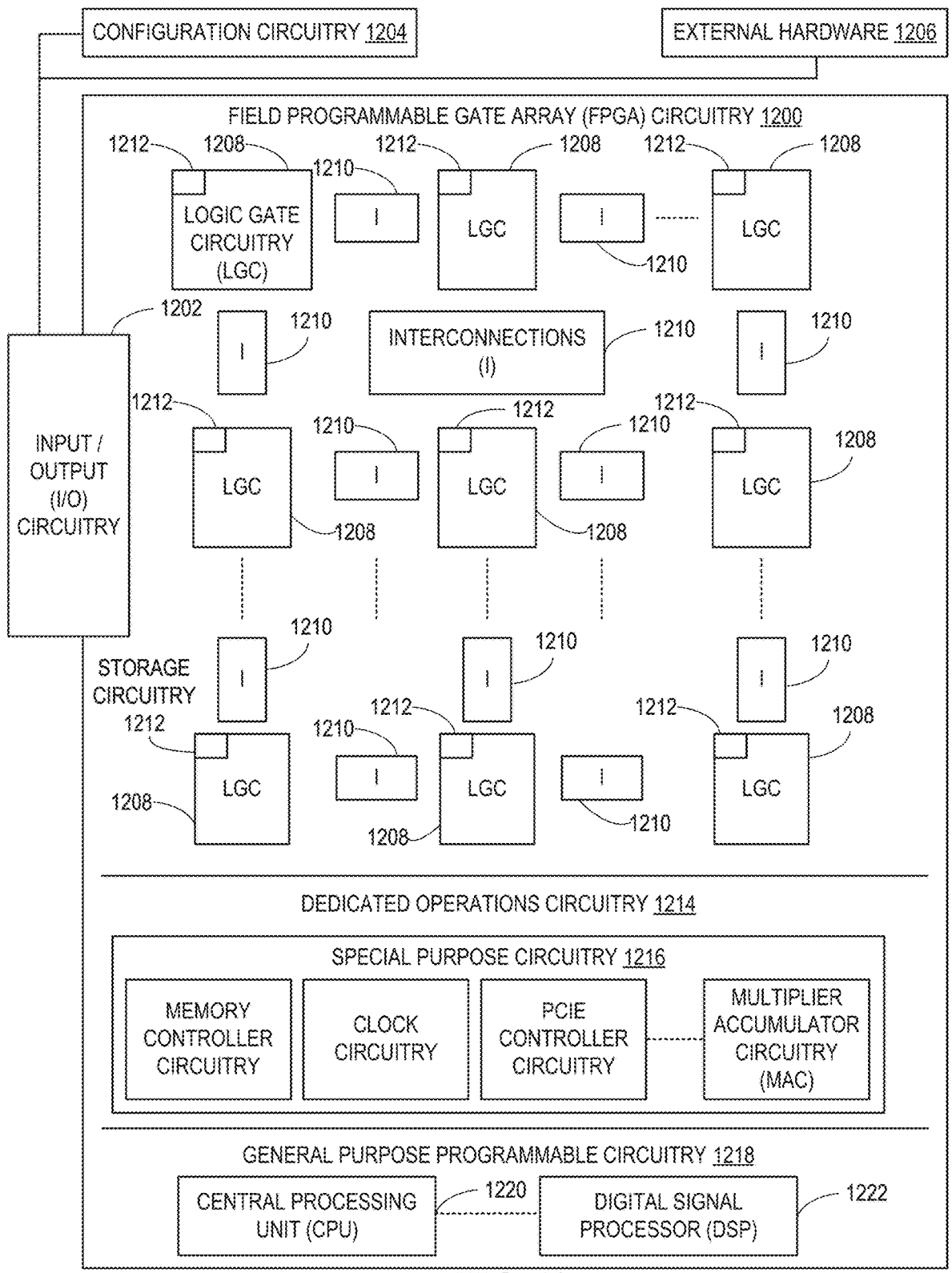
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 1 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 5-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 5-9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 5-9. As such, the FPGA circuitry 1200 may be structured to effectively instantiate some or all of the machine readable instructions of the flowcharts of FIGS. 5-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 5-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 5-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 5-9 may be executed by one or more of the cores 1102 of FIG. 11 and a second portion of the machine readable instructions represented by the flowcharts of FIGS. 5-9 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
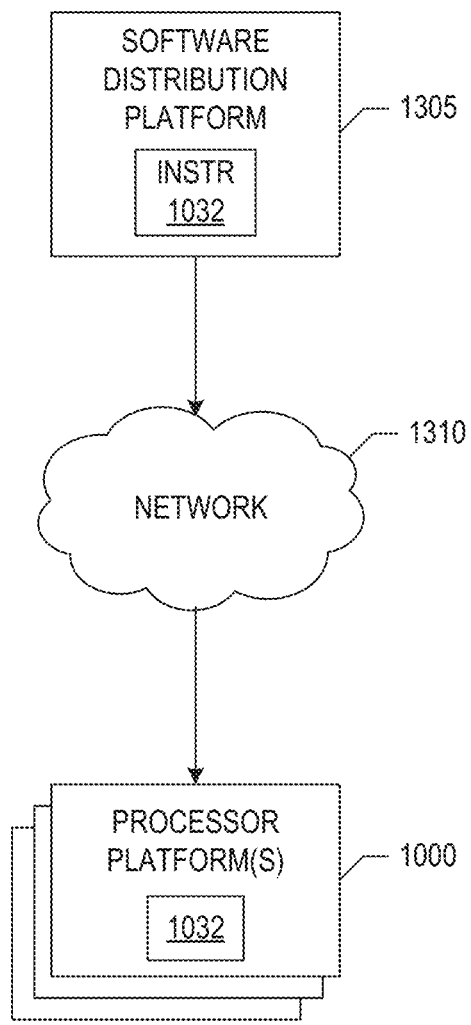
FIG. 13 is a block diagram of an example software distribution platform (e.g., one or more servers) to distribute software (e.g., software corresponding to the example machine readable instructions of FIGS. 5-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 500, 504, 506, 800, 900 of FIGS. 5-9, as described above. The one or more servers of the example software distribution platform 1305 are in communication with a network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 500, 504, 506, 800, 900 of FIGS. 5-9, may be downloaded to the example processor platform 1000, which is to execute the machine readable instructions 1032 to implement the contextual usage control circuitry 108. In some example, one or more servers of the software distribution platform 1305 periodically offer, transmit, and/or force updates to the software (e.g., the example machine readable instructions 500, 504, 506, 800, 900 of FIGS. 5-9) to ensure improvements, patches, updates, etc., are distributed and applied to the software at the end user devices.

From the foregoing, it will be appreciated that example systems, methods, apparatus, and articles of manufacture have been disclosed that facilitate natural interactive control with camera functions, which enhances the user experience during the generation and/or organization of content. Examples disclosed herein include artificial intelligence-based systems that leverage natural language semantic understanding to predict user intent from speech, head pose detection and gesture recognition to perform camera actions, and object detection, tracking, and super resolution to deliver studio quality immersive video content. In examples of multi-camera systems, actions across the cameras can be taken in real time while alleviating the user of the complexities and stress of multi-camera livestreaming by allowing the user to focus only on the content. Thus, disclosed example systems, methods, apparatus, and articles of manufacture improve the efficiency of using a computing device by causing automatic hands-free operation of one or more cameras based on context and in accordance with predicted user intent. Disclosed example systems, methods, apparatus, and articles of manufacture are accordingly directed to one or more improvement(s) in the operation of a machine such as a computer or other electronic and/or mechanical device.

Examples disclosed herein may be implemented on a device, over a network, in an edge environment, and/or in a cloud environment. The capability of contextual usage control of one or more cameras also may be integrated into social media platforms.

Apparatus, systems, methods, and articles of manufacture are disclosed for contextual usage control of cameras. Example 1 is an apparatus that includes at least one memory; instructions in the apparatus; and processor circuitry to execute the instructions to: access one or more images from a camera; detect an object in the one or more images; detect a human activity in the one or more images; build a context based on the object and the human activity; create a visual marker on the one or more images; determine a user voice command; determine a control based on the context, the visual marker, and the voice command; and cause a change in one or more of the one or more images based on the control.

Example 2 includes the apparatus of Example 1, wherein the one or more images form a video.

Example 3 includes the apparatus of Examples 1 or 2, wherein the processor circuitry is to cause the change in the video during a live transmission.

Example 4 includes the apparatus of any of Examples 1-3, wherein the processor circuitry is to: determine at least one of a coordinate or a vector of the object; track the object based on the at least one of the coordinate or the vector; and cause an additional change in the one or more images based on tracking the object.

Example 5 includes the apparatus of any of Examples 1-4, wherein the human activity is a gesture in the one or more images and the change is a zooming.

Example 6 includes the apparatus of any of Examples 1-5, wherein the human activity is a gesture in the one or more images and the change is a panning.

Example 7 includes the apparatus of any of Examples 1-6, wherein the human activity is an orientation of a face in the one or more images.

Example 8 includes the apparatus of any of Examples 1-7, wherein to create the visual marker, the processor circuitry is to: determine pixel color for a plurality of pixels in the one or more images; determine an occlusion factor of at least a portion of the visual marker based on content in the one or more images and the pixel color; and select a text color of the visual marker based on the occlusion factor.

Example 9 includes the apparatus of any of Examples 1-8, wherein to create the visual marker, the processor circuitry is to: determine an occlusion factor of at least a portion of the visual marker based on content in the one or more images; and select a location of the visual marker based on the occlusion factor.

Example 10 includes the apparatus of any of Examples 1-9, wherein to create the visual marker, the processor circuitry is to select text of the visual marker based on information accessed from least one of a user profile, a social media profile, crowdsourced data, or a pattern of prior usage.

Example 11 includes the apparatus of any of Examples 1-10, wherein the change is a cropping of the one or more images based on the object.

Example 12 includes the apparatus of any of Examples 1-11, wherein the camera is a first camera, and the one or more images include one or more images from the first camera and one or more images from a second camera, and the change is a switch to present the one or more images from the second camera based on at least one of the object or the human activity.

Example 13 is an apparatus that includes an interface to access one or more images from a camera; object detection circuitry to detect an object in the one or more images; human activity detection circuitry to detect a human activity in the one or more images; context builder circuitry to build a context based on the object and the human activity; visual marker circuitry to create a visual marker on the one or more images; voice detection circuitry to determine a user voice command; intent determination circuitry determine a control based on the context, the visual marker, and the voice command; and image processing circuitry to cause a change in one or more of the one or more images based on the control.

Example 14 includes the apparatus of Example 13, wherein the one or more images form a video.

Example 15 includes the apparatus of Examples 13 or 14, wherein the image processing circuitry is to cause the change in the video during a live transmission.

Example 16 includes the apparatus of any of Examples 13-15, wherein the object detection circuitry is to: determine at least one of a coordinate or a vector of the object; and track the object based on the at least one of the coordinate or the vector; and the image processing circuitry is to cause an additional change in the one or more images based on tracking the object.

Example 17 includes the apparatus of any of Examples 13-16, wherein the human activity is a gesture in the one or more images and the change is a zooming.

Example 18 includes the apparatus of any of Examples 13-17, wherein the human activity is a gesture in the one or more images and the change is a panning.

Example 19 includes the apparatus of any of Examples 13-18, wherein the human activity is an orientation of a face in the one or more images.

Example 20 includes the apparatus of any of Examples 13-19, wherein to create the visual marker, the visual marker circuitry is to: determine pixel color for a plurality of pixels in the one or more images; determine an occlusion factor of at least a portion of the visual marker based on content in the one or more images and the pixel color; and select a text color of the visual marker based on the occlusion factor.

Example 21 includes the apparatus of any of Examples 13-20, wherein to create the visual marker, the visual marker circuitry is to: determine an occlusion factor of at least a portion of the visual marker based on content in the one or more images; and select a location of the visual marker based on the occlusion factor.

Example 22 includes the apparatus of any of Examples 13-21, wherein to create the visual marker, the visual marker circuitry is to select text of the visual marker based on information accessed from least one of a user profile, a social media profile, crowdsourced data, or a pattern of prior usage.

Example 23 includes the apparatus of any of Examples 13-22, wherein the change is a cropping of the one or more images based on the object.

Example 24 includes the apparatus of any of Examples 13-23, wherein the camera is a first camera, and the one or more images include one or more images from the first camera and one or more images from a second camera, and the change is a switch to present the one or more images from the second camera based on at least one of the object or the human activity.

Example 25 is an apparatus that includes means for accessing one or more images from a camera; means for detecting an object in the one or more images; means for detecting a human activity in the one or more images; means for building a context based on the object and the human activity; means for creating a visual marker on the one or more images; means for determining a user voice command; means for determining a control based on the context, the visual marker, and the voice command; and means for causing a change in one or more of the one or more images based on the control.

Example 26 includes the apparatus of Example 25, wherein the one or more images form a video.

Example 27 includes the apparatus of Examples 25 or 26, wherein the means for causing a change is to cause the change in the video during a live transmission.

Example 28 includes the apparatus of any of Examples 25-27, wherein means for detecting an object is to: determine at least one of a coordinate or a vector of the object; and track the object based on the at least one of the coordinate or the vector; and the means for causing is to cause an additional change in the one or more images based on tracking the object.

Example 29 includes the apparatus of any of Examples 25-28, wherein the human activity is a gesture in the one or more images and the change is a zooming.

Example 30 includes the apparatus of any of Examples 25-29, wherein the human activity is a gesture in the one or more images and the change is a panning.

Example 31 includes the apparatus of any of Examples 25-30, wherein the human activity is an orientation of a face in the one or more images.

Example 32 includes the apparatus of any of Examples 25-31, wherein to create the visual marker, the means for creating is to: determine pixel color for a plurality of pixels in the one or more images; determine an occlusion factor of at least a portion of the visual marker based on content in the one or more images and the pixel color; and select a text color of the visual marker based on the occlusion factor.

Example 33 includes the apparatus of any of Examples 25-32, wherein to create the visual marker, the means for creating is to: determine an occlusion factor of at least a portion of the visual marker based on content in the one or more images; and select a location of the visual marker based on the occlusion factor.

Example 34 includes the apparatus of any of Examples 25-33, wherein to create the visual marker, the means for creating is to select text of the visual marker based on information accessed from least one of a user profile, a social media profile, crowdsourced data, or a pattern of prior usage.

Example 35 includes the apparatus of any of Examples 25-34, wherein the change is a cropping of the one or more images based on the object.

Example 36 includes the apparatus of any of Examples 25-35, wherein the camera is a first camera, and the one or more images include one or more images from the first camera and one or more images from a second camera, and the change is a switch to present the one or more images from the second camera based on at least one of the object or the human activity.

Example 37 is a non-transitory computer readable medium including instructions, which when executed, cause a machine to at least: detect an object in one or more images accessed from a camera; detect a human activity in the one or more images; build a context based on the object and the human activity; create a visual marker on the one or more images; determine a user voice command; determine a control based on the context, the visual marker, and the voice command; and cause a change in one or more of the one or more images based on the control.

Example 38 includes the computer readable medium of Example 37, wherein the one or more images form a video.

Example 39 includes the computer readable medium of Examples 37 or 38, wherein the instructions are to cause the machine to cause the change in the video during a live transmission.

Example 40 includes the computer readable medium of any of Examples 37-39, wherein the instructions are to cause the machine to: determine at least one of a coordinate or a vector of the object; track the object based on the at least one of the coordinate or the vector; and cause an additional change in the one or more images based on tracking the object.

Example 41 includes the computer readable medium of any of Examples 37-40, wherein the human activity is a gesture in the one or more images and the change is a zooming.

Example 42 includes the computer readable medium of any of Examples 37-41, wherein the human activity is a gesture in the one or more images and the change is a panning.

Example 43 includes the computer readable medium of any of Examples 37-42, wherein the human activity is an orientation of a face in the one or more images.

Example 44 includes the computer readable medium of any of Examples 37-43, wherein to create the visual marker, the instructions are to cause the machine to: determine pixel color for a plurality of pixels in the one or more images; determine an occlusion factor of at least a portion of the visual marker based on content in the one or more images and the pixel color; and select a text color of the visual marker based on the occlusion factor.

Example 45 includes the computer readable medium of any of Examples 37-44, wherein to create the visual marker, the instructions are to cause the machine to: determine an occlusion factor of at least a portion of the visual marker based on content in the one or more images; and select a location of the visual marker based on the occlusion factor.

Example 46 includes the computer readable medium of any of Examples 37-45, wherein to create the visual marker, the instructions are to cause the machine to select text of the visual marker based on information accessed from least one of a user profile, a social media profile, crowdsourced data, or a pattern of prior usage.

Example 47 includes the computer readable medium of any of Examples 37-46, wherein the change is a cropping of the one or more images based on the object.

Example 48 includes the computer readable medium of any of Examples 37-47, wherein the camera is a first camera, and the one or more images include one or more images from the first camera and one or more images from a second camera, and the change is a switch to present the one or more images from the second camera based on at least one of the object or the human activity.

Example 49 is a method for contextual usage control of a camera, the method including: detecting, by executing instructions with a processor, an object in one or more images accessed from a camera; detecting, by executing instructions with the processor, a human activity in the one or more images; building, by executing instructions with the processor, a context based on the object and the human activity; creating, by executing instructions with the processor, a visual marker on the one or more images; determining, by executing instructions with the processor, a user voice command; determining, by executing instructions with the processor, a control based on the context, the visual marker, and the voice command; and causing, by executing instructions with the processor, a change in one or more of the one or more images based on the control.

Example 50 includes the method of Example 49, wherein the one or more images form a video.

Example 51 includes the method of Examples 49 or 50, further including causing the change in the video during a live transmission.

Example 52 include the method of any of Examples 49-51, further including: determining at least one of a coordinate or a vector of the object; tracking the object based on the at least one of the coordinate or the vector; and causing an additional change in the one or more images based on tracking the object.

Example 53 include the method of any of Examples 49-52, wherein the human activity is a gesture in the one or more images and the change is a zooming.

Example 54 include the method of any of Examples 49-53, wherein the human activity is a gesture in the one or more images and the change is a panning.

Example 55 include the method of any of Examples 49-54, wherein the human activity is an orientation of a face in the one or more images.

Example 56 include the method of any of Examples 49-55, further including creating the visual marker by: determining pixel color for a plurality of pixels in the one or more images; determining an occlusion factor of at least a portion of the visual marker based on content in the one or more images and the pixel color; and selecting a text color of the visual marker based on the occlusion factor.

Example 57 include the method of any of Examples 49-56, further including creating the visual marker by: determining an occlusion factor of at least a portion of the visual marker based on content in the one or more images; and selecting a location of the visual marker based on the occlusion factor.

Example 58 include the method of any of Examples 49-57, further including creating the visual marker by selecting text of the visual marker based on information accessed from least one of a user profile, a social media profile, crowdsourced data, or a pattern of prior usage.

Example 59 include the method of any of Examples 49-58, wherein the change is a cropping of the one or more images based on the object.

Example 60 include the method of any of Examples 49-59, wherein the camera is a first camera, and the one or more images include one or more images from the first camera and one or more images from a second camera, and the change is a switch to present the one or more images from the second camera based on at least one of the object or the human activity.

Example 61 is an apparatus that includes at least one memory; instructions in the apparatus; and processor circuitry to execute the instructions to: access one or more images from a camera; detect at least one of an object in the one or more images, a human activity in the one or more images, or an element of a scene in the one or more images; create a visual marker on the one or more images; determine a user voice command; determine a control based on: at least one of the detected object, the detected human activity, or the detected element of the scene, the visual marker, and the voice command; and cause a change in one or more of the one or more images based on the control.

Example 62 includes the apparatus of Example 61, wherein the one or more images form a video.

Example 63 includes the apparatus of Examples 61 or 62, wherein the processor circuitry is to cause the change in the video during a live transmission.

Example 64 includes the apparatus of any of Examples 61-63, wherein the processor circuitry is to: determine at least one of a coordinate or a vector of the object; track the object based on the at least one of the coordinate or the vector; and cause an additional change in the one or more images based on tracking the object.

Example 65 includes the apparatus of any of Examples 61-64, wherein the human activity is a gesture in the one or more images and the change is a zooming.

Example 66 includes the apparatus of any of Examples 61-65, wherein the human activity is a gesture in the one or more images and the change is a panning.

Example 67 includes the apparatus of any of Examples 61-66, wherein the human activity is an orientation of a face in the one or more images.

Example 68 includes the apparatus of any of Examples 61-67, wherein to create the visual marker, the processor circuitry is to: determine pixel color for a plurality of pixels in the one or more images; determine an occlusion factor of at least a portion of the visual marker based on content in the one or more images and the pixel color; and select a text color of the visual marker based on the occlusion factor.

Example 69 includes the apparatus of any of Examples 61-68, wherein to create the visual marker, the processor circuitry is to: determine an occlusion factor of at least a portion of the visual marker based on content in the one or more images; and select a location of the visual marker based on the occlusion factor.

Example 70 includes the apparatus of any of Examples 61-69, wherein to create the visual marker, the processor circuitry is to select text of the visual marker based on information accessed from least one of a user profile, a social media profile, crowdsourced data, or a pattern of prior usage.

Example 71 includes the apparatus of any of Examples 61-70, wherein the change is a cropping of the one or more images based on the object.

Example 72 includes the apparatus of any of Examples 61-71, wherein the camera is a first camera, and the one or more images include one or more images from the first camera and one or more images from a second camera, and the change is a switch to present the one or more images from the second camera based on at least one of the object or the human activity Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions; and
   at least one programmable circuit to be programmed by the instructions to:
      detect an object in the one or more images from a camera;
      detect a human activity in the one or more images;
      build a context based on the object and the human activity;
      create a visual marker on the one or more images by:
         determining an occlusion factor of at least a portion of the visual marker based on content in the one or more images; and
         selecting a location of the visual marker based on the occlusion factor;
      determine a user voice command;
      determine a control based on the context, the visual marker, and the voice command; and
      cause a change in one or more of the one or more images based on the control.

2. The apparatus of claim 1, wherein the one or more images form a video.

3. The apparatus of claim 2, wherein, one or more of the at least one programmable circuit is to cause the change in the video during a live transmission.

4. The apparatus of claim 1, wherein, one or more of the at least one programmable circuit is to:
   determine at least one of a coordinate or a vector of the object;
   track the object based on the at least one of the coordinate or the vector; and
   cause an additional change in the one or more images based on tracking the object.

5. The apparatus of claim 1, wherein the human activity is a gesture in the one or more images and the change is a zooming.

6. The apparatus of claim 1, wherein the human activity is a gesture in the one or more images and the change is a panning.

7. The apparatus of claim 1, wherein the human activity is an orientation of a face in the one or more images.

8. The apparatus of claim 1, wherein to create the visual marker, one or more of the at least one programmable circuit is to select text of the visual marker based on information accessed from least one of a user profile, a social media profile, crowdsourced data, or a pattern of prior usage.

9. The apparatus of claim 1, wherein the change is a cropping of the one or more images based on the object.

10. The apparatus of claim 1, wherein the camera is a first camera, and the one or more images include one or more images from the first camera and one or more images from a second camera, and the change is a switch to present the one or more images from the second camera based on at least one of the object or the human activity.

11. An apparatus comprising:
   at least one memory;
   instructions; and
   at least one programmable circuit to be programmed by the instructions to:
      detect an object in one or more images from a camera;
      detect a human activity in the one or more images;
      build a context based on the object and the human activity;
      create a visual marker on the one or more images by:
         determining pixel color for a plurality of pixels in the one or more images;
         determining an occlusion factor of at least a portion of the visual marker based on content in the one or more images and the pixel color; and
         selecting a text color of the visual marker based on the occlusion factor;
      determine a user voice command;
      determine a control based on the context, the visual marker, and the voice command; and
      cause a change in one or more of the one or more images based on the control.

12. A non-transitory computer readable medium comprising instructions to cause a machine to at least:
   detect an object in one or more images accessed from a camera;
   detect a human activity in the one or more images;
   build a context based on the object and the human activity;
   create a visual marker on the one or more images by:
      determining pixel color for a plurality of pixels in the one or more images;
      determining an occlusion factor of at least a portion of the visual marker based on content in the one or more images and the pixel color; and
      selecting a text color of the visual marker based on the occlusion factor;
   determine a user voice command;
   determine a control based on the context, the visual marker, and the voice command; and
   cause a change in one or more of the one or more images based on the control.

13. The computer readable medium of claim 12, wherein the one or more images form a video.

14. The computer readable medium of claim 13, wherein the instructions are to cause the machine to cause the change in the video during a live transmission.

15. The computer readable medium of claim 12, wherein the instructions are to cause the machine to:
   determine at least one of a coordinate or a vector of the object;
   track the object based on the at least one of the coordinate or the vector; and
   cause an additional change in the one or more images based on tracking the object.

16. The computer readable medium of claim 12, wherein the human activity is a gesture in the one or more images and the change is a zooming.

17. The computer readable medium of claim 12, wherein the human activity is a gesture in the one or more images and the change is a panning.

18. The computer readable medium of claim 12, wherein the human activity is an orientation of a face in the one or more images.

19. The computer readable medium of claim 12, wherein to create the visual marker, the instructions are to cause the machine to select a location of the visual marker based on the occlusion factor.

20. The computer readable medium of claim 12, wherein to create the visual marker, the instructions are to cause the machine to select text of the visual marker based on information accessed from least one of a user profile, a social media profile, crowdsourced data, or a pattern of prior usage.

21. The computer readable medium of claim 12, wherein the change is a cropping of the one or more images based on the object.

22. The computer readable medium of claim 12, wherein the camera is a first camera, and the one or more images include one or more images from the first camera and one or more images from a second camera, and the change is a switch to present the one or more images from the second camera based on at least one of the object or the human activity.

* * * * *